(12) United States Patent
Fujita et al.

(10) Patent No.: US 10,293,639 B2
(45) Date of Patent: May 21, 2019

(54) BICYCLE HUB ASSEMBLY

(71) Applicant: SHIMANO INC., Sakai (JP)

(72) Inventors: Hiroshi Fujita, Sakai (JP); Naohiro Nishimoto, Sakai (JP); Kazuki Koshiyama, Sakai (JP)

(73) Assignee: SHIMANO INC., Sakai (JP)

( * ) Notice: Subject to any disclaimer, the term of this patent is extended or adjusted under 35 U.S.C. 154(b) by 113 days.

(21) Appl. No.: 15/583,927

(22) Filed: May 1, 2017

(65) Prior Publication Data

US 2017/0232791 A1   Aug. 17, 2017

Related U.S. Application Data

(62) Division of application No. 14/873,141, filed on Oct. 1, 2015, now Pat. No. 9,707,801.

(51) Int. Cl.
*B60B 27/04* (2006.01)
*B60B 27/00* (2006.01)
(Continued)

(52) U.S. Cl.
CPC ........ *B60B 27/047* (2013.01); *B60B 27/0026* (2013.01); *B60B 27/0031* (2013.01); *B60B 27/023* (2013.01); *F16D 1/06* (2013.01); *F16D 1/10* (2013.01); *F16D 41/36* (2013.01); *B60B 2360/32* (2013.01); *B60B 2900/133* (2013.01); *B60B 2900/325* (2013.01); *B62M 9/121* (2013.01); *F16D 2001/103* (2013.01)

(58) Field of Classification Search
None
See application file for complete search history.

(56) References Cited

U.S. PATENT DOCUMENTS 3,554,340 A * 1/1971 Shinnano ................ F16D 41/30
                                                    192/64
5,964,332 A    10/1999 King
(Continued)

FOREIGN PATENT DOCUMENTS

DE    202014001591 U1    3/2014
DE    102016101498       8/2016

OTHER PUBLICATIONS

Office Action with Form PTO-892 Notice of References Cited issued by the U.S. Patent and Trademark Office for the U.S. Appl. No. 14/873,141, dated Dec. 22, 2016.

*Primary Examiner* — Mark A Manley
(74) *Attorney, Agent, or Firm* — Mori & Ward, LLP

(57) ABSTRACT

A bicycle hub assembly comprises a hub axle, a hub shell, a sprocket support body, a first ratchet member, a second ratchet member, and a sliding member. The hub shell includes at least one first tooth. The sprocket support body includes a first helical spline. The first ratchet member comprises at least one first ratchet tooth and a second helical spline engaged with the first helical spline. The second ratchet member comprises at least one second ratchet tooth and at least one second tooth. The at least one second ratchet tooth is engageable with the at least one first ratchet tooth. The at least one second tooth is engaged with the at least one first tooth. The sliding member is provided between the sprocket support body and the second ratchet member in an axial direction parallel to a rotational axis. The sliding member includes a non-metallic material.

17 Claims, 18 Drawing Sheets

(51) Int. Cl.
*B60B 27/02* (2006.01)
*F16D 41/36* (2006.01)
*F16D 1/06* (2006.01)
*F16D 1/10* (2006.01)
*B62M 9/121* (2010.01)

(56) References Cited

U.S. PATENT DOCUMENTS

| | | |
|---|---|---|
| 6,123,179 A | 9/2000 | Chen |
| 6,478,128 B2 | 11/2002 | Taylor |
| 6,588,564 B1 | 7/2003 | Jager et al. |
| 8,096,623 B2 | 1/2012 | You |
| 8,371,660 B2 | 2/2013 | Shook |
| 2008/0006500 A1* | 1/2008 | Spahr .............. B60B 27/0073 192/64 |
| 2008/0315679 A1 | 12/2008 | Shook |
| 2011/0175433 A1 | 7/2011 | Chiang |
| 2011/0193406 A1 | 8/2011 | Chiang |
| 2012/0032498 A1 | 2/2012 | Klieber |
| 2013/0076112 A1 | 3/2013 | Tho |
| 2013/0088075 A1 | 4/2013 | Spahr et al. |
| 2014/0187339 A1 | 7/2014 | Kurokawa |
| 2015/0060224 A1 | 3/2015 | Lee |
| 2015/0202919 A1 | 7/2015 | Kishiyama |
| 2016/0223033 A1 | 8/2016 | Fujita et al. |

* cited by examiner

BICYCLE HUB ASSEMBLY

CROSS-REFERENCE TO RELATED APPLICATIONS

The present application is a divisional application of the U.S. patent application Ser. No. 14/873,141 filed Oct. 1, 2015. The contents of this application are incorporated herein by reference in their entirety.

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle hub assembly.

SUMMARY OF THE INVENTION

In accordance with a first aspect of the present invention, a bicycle hub assembly comprises a hub axle, a hub shell, a sprocket support body, a first ratchet member, a second ratchet member, and a sliding member. The hub axle defines a rotational axis. The hub shell is rotatably mounted on the hub axle to rotate about the rotational axis. The hub shell includes at least one first tooth. The sprocket support body is rotatably mounted on the hub axle to rotate about the rotational axis. The sprocket support body includes a first helical spline. The first ratchet member comprises at least one first ratchet tooth and a second helical spline engaged with the first helical spline. The second ratchet member comprises at least one second ratchet tooth and at least one second tooth. The at least one second ratchet tooth is engageable with the at least one first ratchet tooth. The at least one second tooth is engaged with the at least one first tooth. The sliding member is provided between the sprocket support body and the second ratchet member in an axial direction parallel to the rotational axis. The sliding member includes a non-metallic material.

With the bicycle hub assembly according to the first aspect, it is possible to reduce or prevent friction sound caused by direct contact between the sprocket support body and the second ratchet member.

In accordance with a second aspect of the present invention, the bicycle hub assembly according to the first aspect is configured so that the sprocket support body includes a first axial surface facing in the axial direction. The second ratchet member includes a second axial surface facing in the axial direction. The sliding member is provided between the first axial surface and the second axial surface in the axial direction.

With the bicycle hub assembly according to the second aspect, it is possible to reduce or prevent friction sound caused by direct contact between the first axial surface and the second axial surface.

In accordance with a third aspect of the present invention, the bicycle hub assembly according to the first or second aspect is configured so that the sliding member has an annular shape.

With the bicycle hub assembly according to the third aspect, it is possible to effectively reduce or prevent friction sound caused by direct contact between the sprocket support body and the second ratchet member with securing strength of the sliding member.

In accordance with a fourth aspect of the present invention, the bicycle hub assembly according to any one of the first or third aspects is configured so that the second ratchet member is provided between the first ratchet member and the sliding member in the axial direction.

With the bicycle hub assembly according to the fourth aspect, the sliding member can receive an axial force applied from the first ratchet member to the second ratchet member in the axial direction.

In accordance with a fifth aspect of the present invention, the bicycle hub assembly according to any one of the first to fourth aspects is configured so that the non-metallic material includes a resin material.

With the bicycle hub assembly according to the fifth aspect, it is possible to reduce or prevent friction sound caused by direct contact between the sprocket support body and the second ratchet member with suppressing an increase in weight of the bicycle hub assembly.

In accordance with a sixth aspect of the present invention, a bicycle hub assembly comprises a hub axle, a hub shell, a sprocket support body, a first ratchet member, a second ratchet member, a biasing member, and an additional biasing member. The hub axle defines a rotational axis. The hub shell is rotatably mounted on the hub axle to rotate about the rotational axis. The hub shell includes at least one first tooth. The sprocket support body is rotatably mounted on the hub axle to rotate about the rotational axis. The sprocket support body includes a first helical spline. The first ratchet member comprises at least one first ratchet tooth and a second helical spline engaged with the first helical spline. The second ratchet member comprises at least one second ratchet tooth and at least one second tooth. The at least one second ratchet tooth is engageable with the at least one first ratchet tooth. The at least one second tooth is engaged with the at least one first tooth. The biasing member is provided between the hub shell and the first ratchet member in an axial direction parallel to the rotational axis to bias the first ratchet member toward the second ratchet member. The additional biasing member is provided between the hub shell and the second ratchet member in the axial direction to bias the second ratchet member toward the sprocket support body.

With the bicycle hub assembly according to the sixth aspect, it is possible to stabilize an orientation of the second ratchet member relative to the hub shell by the additional biasing member. This can reduce or prevent friction sound caused by direct contact between the hub shell and the second ratchet member.

In accordance with a seventh aspect of the present invention, the bicycle hub assembly according to the sixth aspect is configured so that the additional biasing member is provided radially outwardly of the biasing member.

With the bicycle hub assembly according to the seventh aspect, it is possible to effectively stabilize the orientation of the second ratchet member relative to the hub shell by the additional biasing member.

In accordance with an eighth aspect of the present invention, the bicycle hub assembly according to the sixth or seventh aspect is configured so that the additional biasing member is provided radially outwardly of the at least one second ratchet tooth.

With the bicycle hub assembly according to the eighth aspect, it is possible to utilize a space provided radially outwardly of the at least one sound ratchet tooth as a space in which the additional biasing member.

In accordance with a ninth aspect of the present invention, the bicycle hub assembly according to any one of the sixth to eighth aspects is configured so that the second ratchet member includes a cylindrical element extending in the axial direction. The at least one second tooth extends radially outwardly from the cylindrical element. The additional biasing member is provided between the hub shell and the cylindrical element in the axial direction.

With the bicycle hub assembly according to the ninth aspect, it is possible to effectively stabilize the orientation of the second ratchet member relative to the hub shell by the additional biasing member.

In accordance with a tenth aspect of the present invention, the bicycle hub assembly according to any one of the sixth to ninth aspects further comprises a supporting member provided between the second ratchet member and the additional biasing member in the axial direction.

With the bicycle hub assembly according to the tenth aspect, it is possible to stabilize an orientation of the additional biasing member relative to the hub shell by the supporting member.

In accordance with an eleventh aspect of the present invention, the bicycle hub assembly according to the tenth aspect is configured so that the supporting member includes an annular base and a radially supporting portion. The annular base is provided between the second ratchet member and the additional biasing member in the axial direction. The radially supporting portion extends from the annular base in the axial direction. The additional biasing member is provided radially outwardly of the radially supporting portion.

With the bicycle hub assembly according to the eleventh aspect, it is possible to further stabilize an orientation of the additional biasing member relative to the hub shell by the supporting member.

In accordance with a twelfth aspect of the present invention, the bicycle hub assembly according to the tenth or eleventh aspect is configured so that the supporting member includes a non-metallic material.

With the bicycle hub assembly according to the twelfth aspect, it is possible to effectively stabilize the orientation of the additional biasing member relative to the hub shell by the supporting member with suppressing an increase in weight of the bicycle hub assembly.

In accordance with a thirteenth aspect of the present invention, a bicycle hub assembly comprises a hub axle, a hub shell, a sprocket support body, a first ratchet member, a second ratchet member, a biasing member, and a receiving member. The hub axle defines a rotational axis. The hub shell is rotatably mounted on the hub axle to rotate about the rotational axis. The hub shell includes at least one first tooth. The sprocket support body is rotatably mounted on the hub axle to rotate about the rotational axis. The sprocket support body includes a first helical spline. The first ratchet member comprises at least one first ratchet tooth and a second helical spline engaged with the first helical spline. The second ratchet member comprises at least one second ratchet tooth and at least one second tooth. The at least one second ratchet tooth is engageable with the at least one first ratchet tooth. The at least one second tooth is engaged with the at least one first tooth. The biasing member is provided between the hub shell and the first ratchet member in an axial direction parallel to the rotational axis to bias the first ratchet member toward the second ratchet member. The receiving member is provided between the first ratchet member and the biasing member in the axial direction.

With the bicycle hub assembly according to the thirteenth aspect, it is possible to stabilize an orientation of the biasing member relative to the hub shell by the receiving member. This can stabilize a motion of the first ratchet member, preventing uneven wear of at least one of the first ratchet member and the second ratchet member.

In accordance with a fourteenth aspect of the present invention, the bicycle hub assembly according to the thirteenth aspect is configured so that the first ratchet member includes a first receiving surface facing in the axial direction. The receiving member is provided between the first receiving surface and the biasing member in the axial direction.

With the bicycle hub assembly according to the fourteenth aspect, it is possible to stabilize an orientation of the receiving member relative to the first ratchet member. This can stabilize the orientation of the biasing member relative to the hub shell. Accordingly, it is possible to effectively prevent uneven wear of at least one of the first ratchet member and the second ratchet member.

In accordance with a fifteenth aspect of the present invention, the bicycle hub assembly according to the thirteenth or fourteenth aspect is configured so that the first ratchet member includes a cylindrical part extending from the first receiving surface in the axial direction. The receiving member is provided radially outwardly of the cylindrical part.

With the bicycle hub assembly according to the fifteenth aspect, it is possible to further stabilize the orientation of the receiving member relative to the first ratchet member. This can further stabilize the orientation of the biasing member relative to the hub shell. Accordingly, it is possible to effectively prevent uneven wear of at least one of the first ratchet member and the second ratchet member.

In accordance with a sixteenth aspect of the present invention, the bicycle hub assembly according to the fifteenth aspect is configured so that the receiving member includes an axially receiving part and a radially receiving part. The axially receiving part is provided between the first receiving surface and the biasing member in the axial direction. The radially receiving part extends from the axially receiving part in the axial direction. The radially receiving part is provided between the cylindrical part and the biasing member in a radial direction perpendicular to the rotational axis.

With the bicycle hub assembly according to the sixteenth aspect, it is possible to further stabilize the orientation of the biasing member relative to the hub shell. Accordingly, it is possible to more effectively prevent uneven wear of at least one of the first ratchet member and the second ratchet member.

In accordance with a seventeenth aspect of the present invention, the bicycle hub assembly according to any one of the thirteenth to sixteenth aspects is configured so that the receiving member includes a non-metallic material.

With the bicycle hub assembly according to the seventeenth aspect, it is possible to reduce or prevent wear of at least one of the biasing member and the first ratchet member with suppressing an increase in weight of the bicycle hub assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
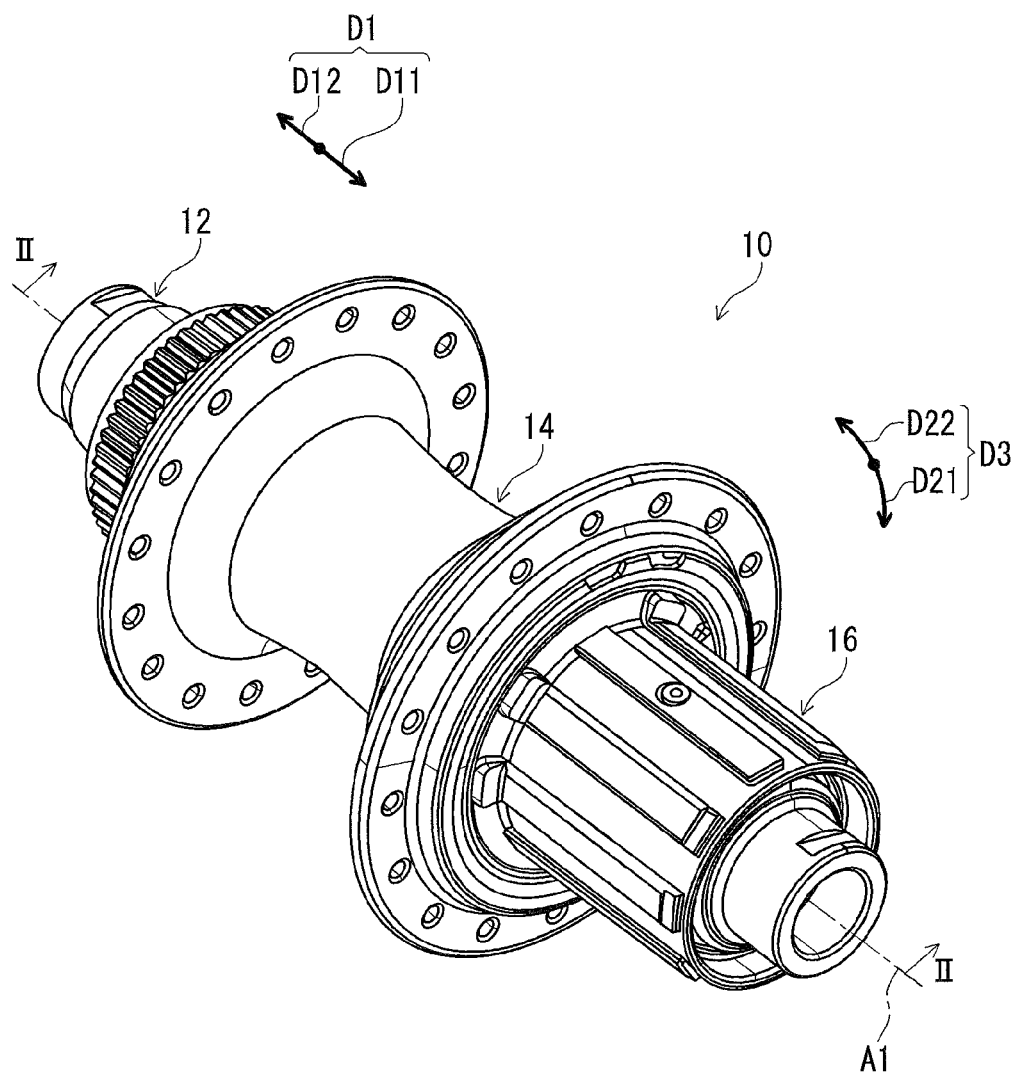
FIG. 1 is a perspective view of a bicycle hub assembly in accordance with a first embodiment.

The embodiments will now be described with reference to the accompanying drawings, wherein like reference numerals designate corresponding or identical elements throughout the various drawings.

Referring initially to FIG. 1, a bicycle hub assembly 10 in accordance with an embodiment is illustrated. While the bicycle hub assembly 10 is a rear hub assembly in this embodiment, structures of the bicycle hub assembly 10 can be applied to a front hub assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle hub assembly 10, should be interpreted relative to the bicycle equipped with the bicycle hub assembly 10 as used in an upright riding position on a horizontal surface.

As seen in FIG. 1, the bicycle hub assembly 10 comprises a hub axle 12, a hub shell 14, and a sprocket support body 16. The hub axle 12 defines a rotational axis A1. For example, the hub axle 12 is secured to a bicycle frame (not shown) via a wheel securing assembly (not shown). The hub shell 14 is rotatably mounted on the hub axle 12 to rotate about the rotational axis A1. A rim (not shown) is coupled to the hub shell 14 via spokes (not shown). The sprocket support body 16 is rotatably mounted on the hub axle 12 to rotate about the rotational axis A1. The sprocket support body 16 is rotatable relative to the hub shell 14 about the rotational axis A1.

Figure 2:
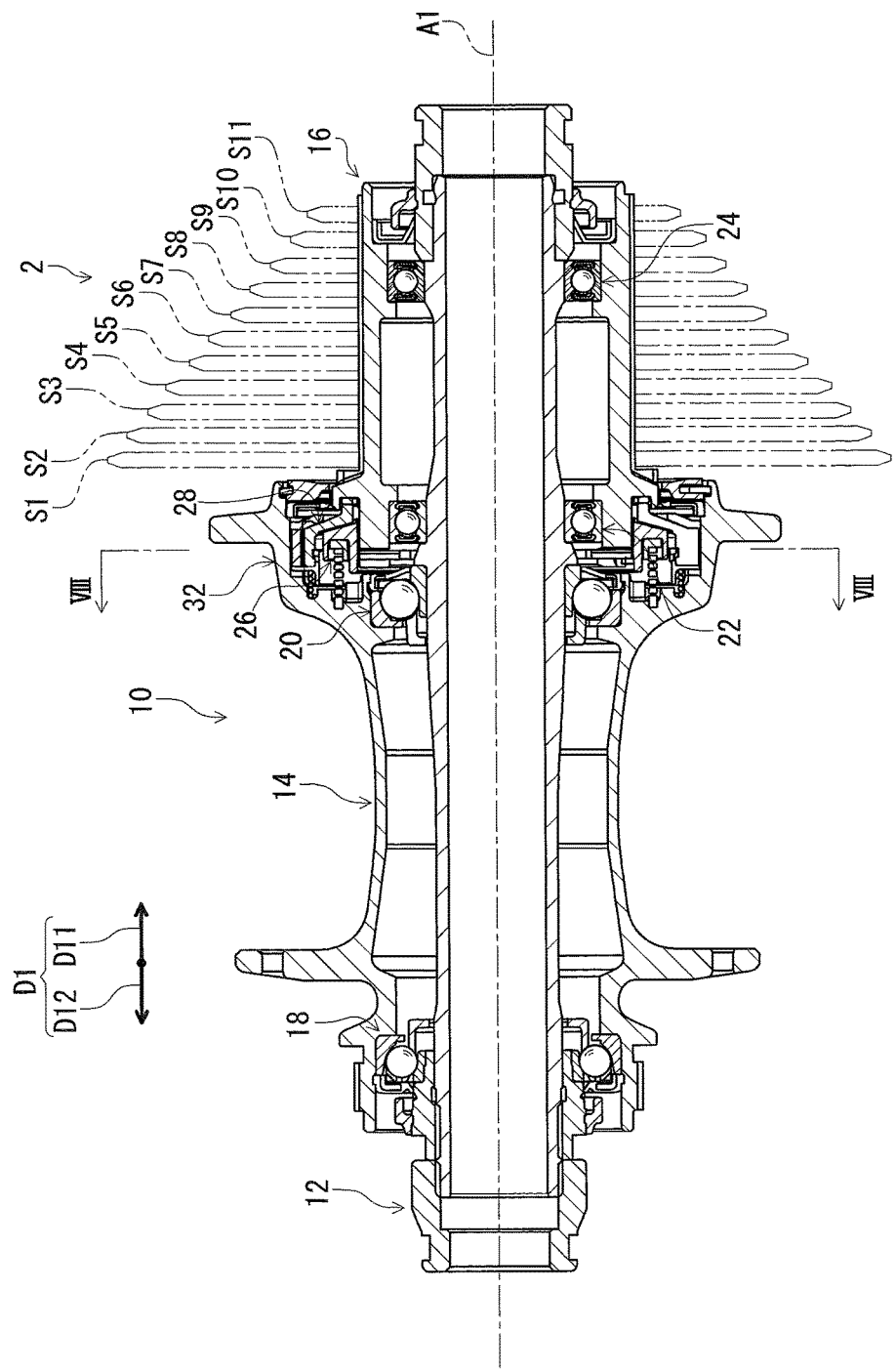
FIG. 2 is a cross-sectional view of the bicycle hub assembly taken along line II-II of FIG. 1.

As seen in FIG. 2, the sprocket support body 16 is mounted to the hub axle 12 support a sprocket assembly 2 including sprockets S1 to S11. The sprocket support body 16 is mounted to the hub axle 12 to receive a rotational force from the sprocket assembly 2 during pedaling. The bicycle hub assembly 10 comprises a first bearing 18 and a second bearing 20. The first bearing 18 and the second bearing 20 are provided between the hub axle 12 and the hub shell 14 to rotatably support the hub shell 14 relative to the hub axle 12 about the rotational axis A1.

The bicycle hub assembly 10 comprises a third bearing 22 and a fourth bearing 24. The third bearing 22 and the fourth bearing 24 are provided between the hub axle 12 and the sprocket support body 16 to rotatably support the sprocket support body 16 relative to the hub axle 12 about the rotational axis A1. The third bearing 22 and the fourth bearing 24 are provided between the hub axle 12 and the sprocket support body 16 to rotatably support the sprocket support body 16 relative to the hub axle 12 about the rotational axis A1.

Figure 3:
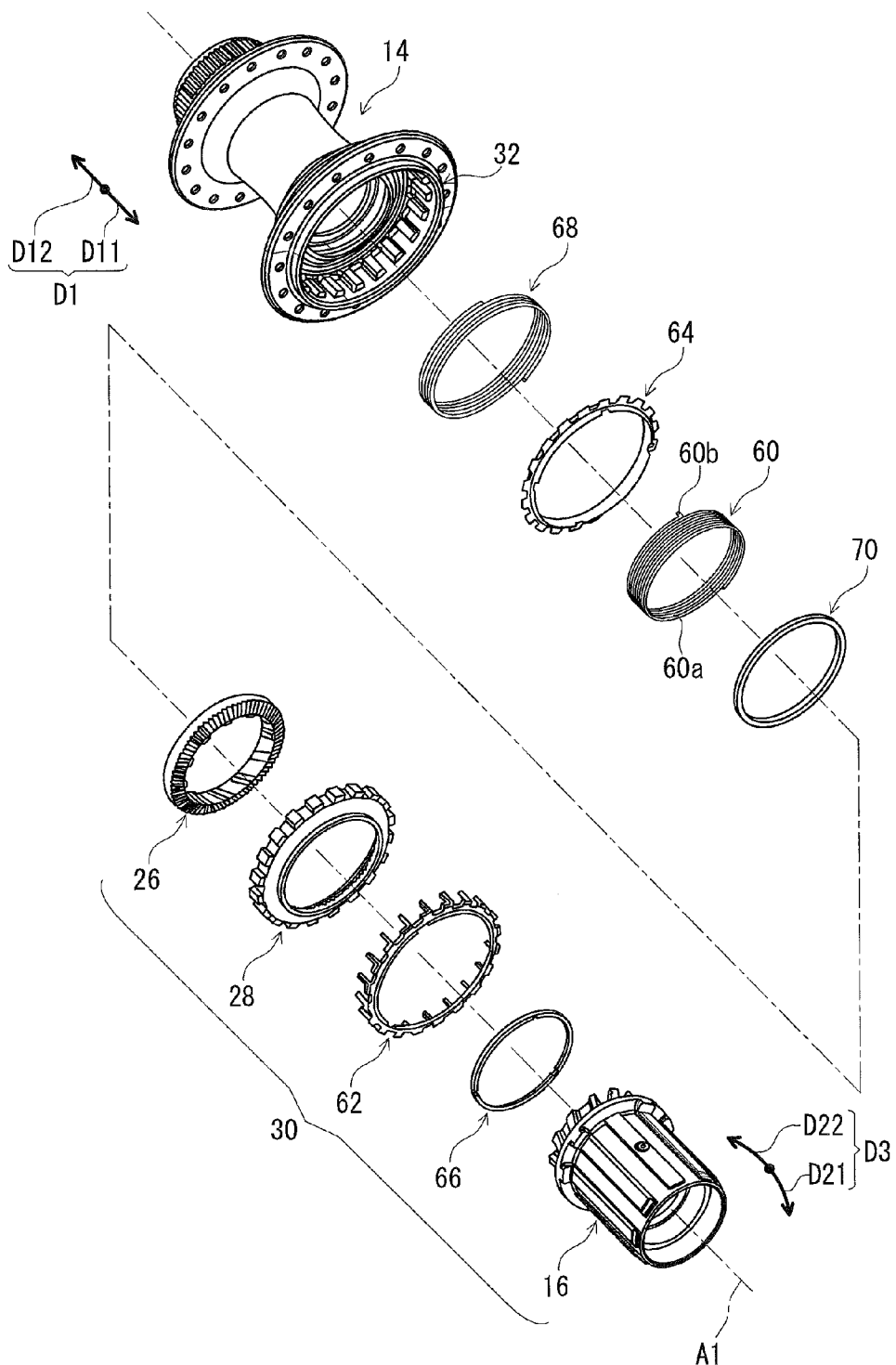
FIG. 3 is an exploded perspective view of a part of the bicycle hub assembly illustrated in FIG. 1.

As seen in FIG. 3, the bicycle hub assembly 10 comprises a first ratchet member 26 and a second ratchet member 28. The first ratchet member 26 is mounted to the sprocket support body 16 to rotate together with the sprocket support body 16 relative to the hub shell 14 about the rotational axis A1. The first ratchet member 26 is movable relative to the sprocket support body 16 in an axial direction D1 parallel to the rotational axis A1. In this embodiment, the axial direction D1 includes a first axial direction D11 and a second axial direction D12 opposite to the first axial direction D11. The second ratchet member 28 is mounted to the hub shell 14 to rotate together with the hub shell 14 relative to the sprocket support body 16 about the rotational axis A1. The second ratchet member 28 is movable relative to the hub shell 14 in the axial direction D1. The sprocket support body 16, the first ratchet member 26, and the second ratchet member 28 provide a bicycle freewheel 30.

The bicycle freewheel 30 prevents the sprocket support body 16 from rotating relative to the hub shell 14 in a driving rotational direction D21 so that a pedaling force is transmitted from the sprocket support body 16 to the hub shell 14 during pedaling. The bicycle freewheel 30 allows the hub shell 14 to rotate relative to the sprocket support body 16 in the driving rotational direction D21 so that a rotational force is not transmitted from the hub shell 14 to the sprocket support body 16 during coasting (also called freewheeling). The driving rotational direction D21 is a direction in which the sprocket support body 16 rotates relative to a bicycle frame (not shown) during pedaling. A circumferential direction D3 of the bicycle hub assembly 10 includes the driving rotational direction D21 and an opposite rotational direction D22 opposite to the driving rotational direction D21. Coasting or freewheeling occurs when the sprocket support body 16 stops rotating relative to the bicycle frame (not shown) in an opposite rotational direction D22 while the hub shell 14 rotates relative to the bicycle frame (not shown) in the driving rotational direction D21.

As seen in FIG. 3, the hub shell 14 includes a freewheel housing 32 having an annular shape. As seen in FIG. 2, the freewheel housing 32 extends in the axial direction D1. The first ratchet member 26 and the second ratchet member 28 are provided in the freewheel housing 32.

Figure 4:
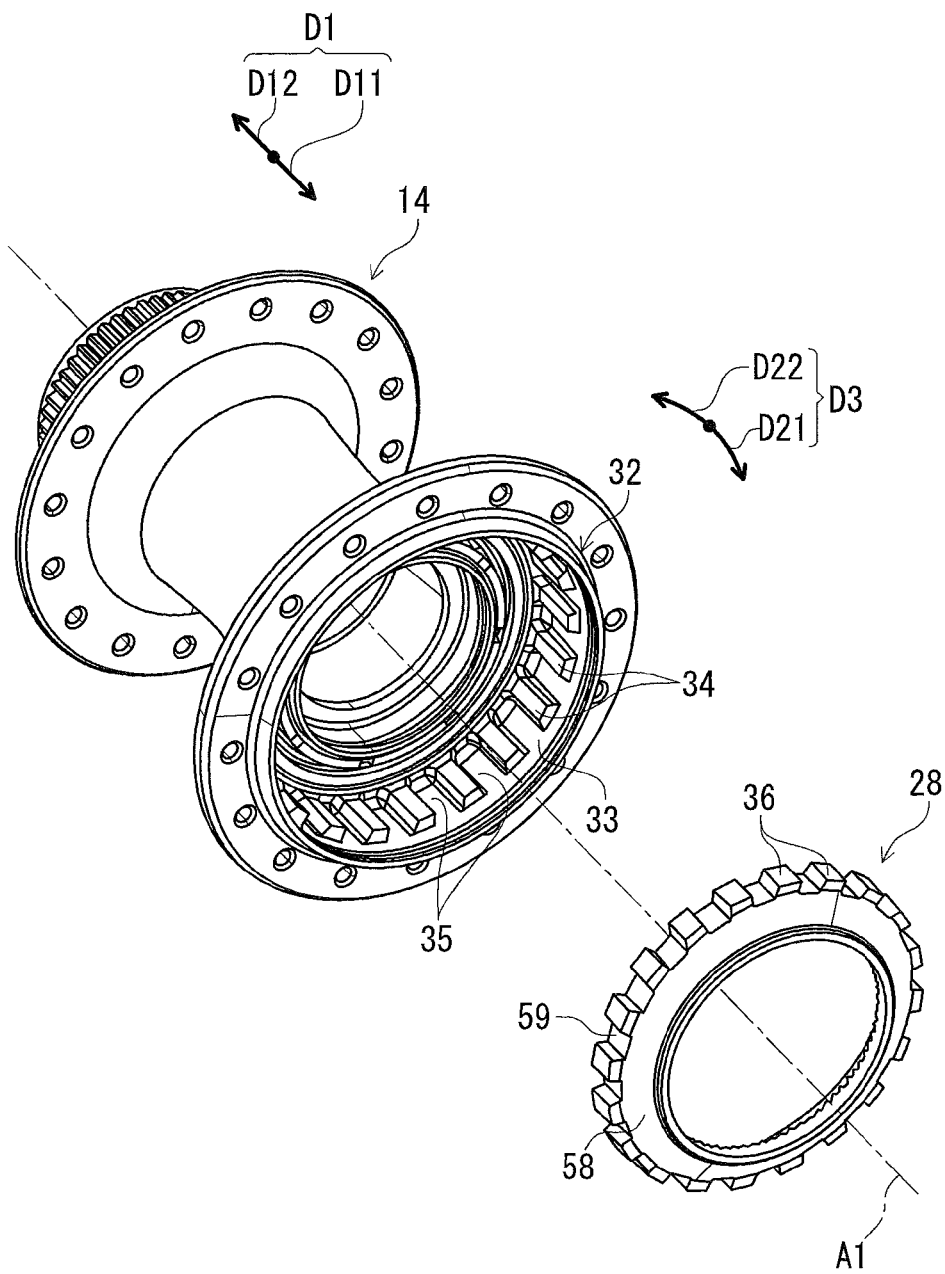
FIG. 4 is an exploded perspective view of a part of the bicycle hub assembly illustrated in FIG. 1.

As seen in FIG. 4, the hub shell 14 includes an inner peripheral surface 33 and at least one first tooth 34. The at least one first tooth 34 is provided on the inner peripheral surface 33. In this embodiment, the freewheel housing 32 includes the inner peripheral surface 33. The hub shell 14 includes a plurality of first teeth 34. The first teeth 34 are provided on the inner peripheral surface 33 and extend radially inwardly from the inner peripheral surface 33. The first teeth 34 are arranged in a circumferential direction D3 to define recesses 35 between adjacent two teeth of the first teeth 34. The circumferential direction D3 is defined about the rotational axis A1 and includes the driving rotational direction D21 and the opposite rotational direction D22.

The second ratchet member 28 comprises at least one second tooth 36. The at least one second tooth 36 is engaged with the at least one first tooth 34. In this embodiment, the second ratchet member 28 comprises a plurality of second teeth 36. The second teeth 36 are engaged with the first teeth 34. The second teeth 36 are arranged in the circumferential direction D3. The second teeth 36 are respectively provided in the recesses 35.

Figure 5:
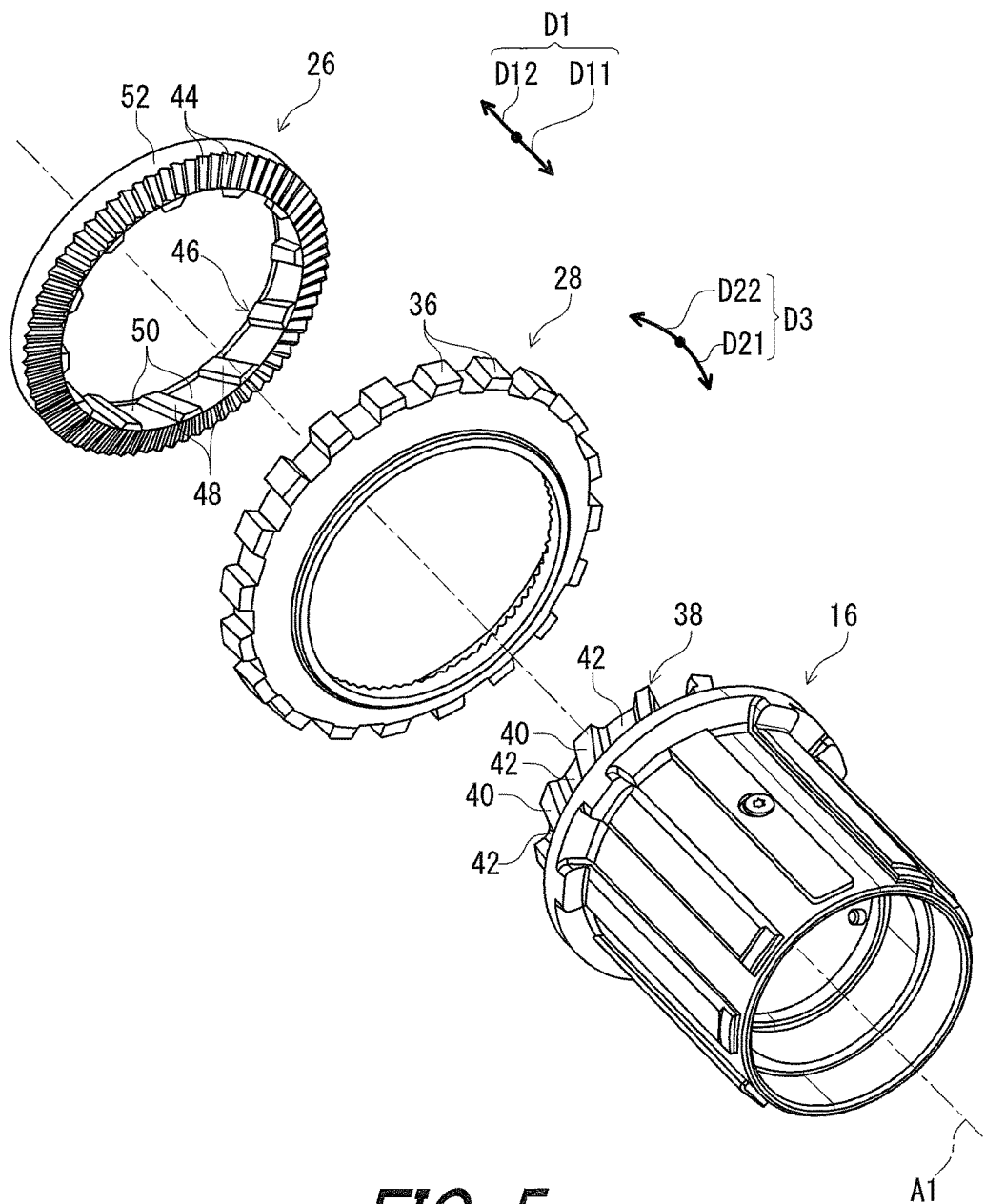
FIG. 5 is an exploded perspective view of a part of the bicycle hub assembly illustrated in FIG. 1.
Figure 6:
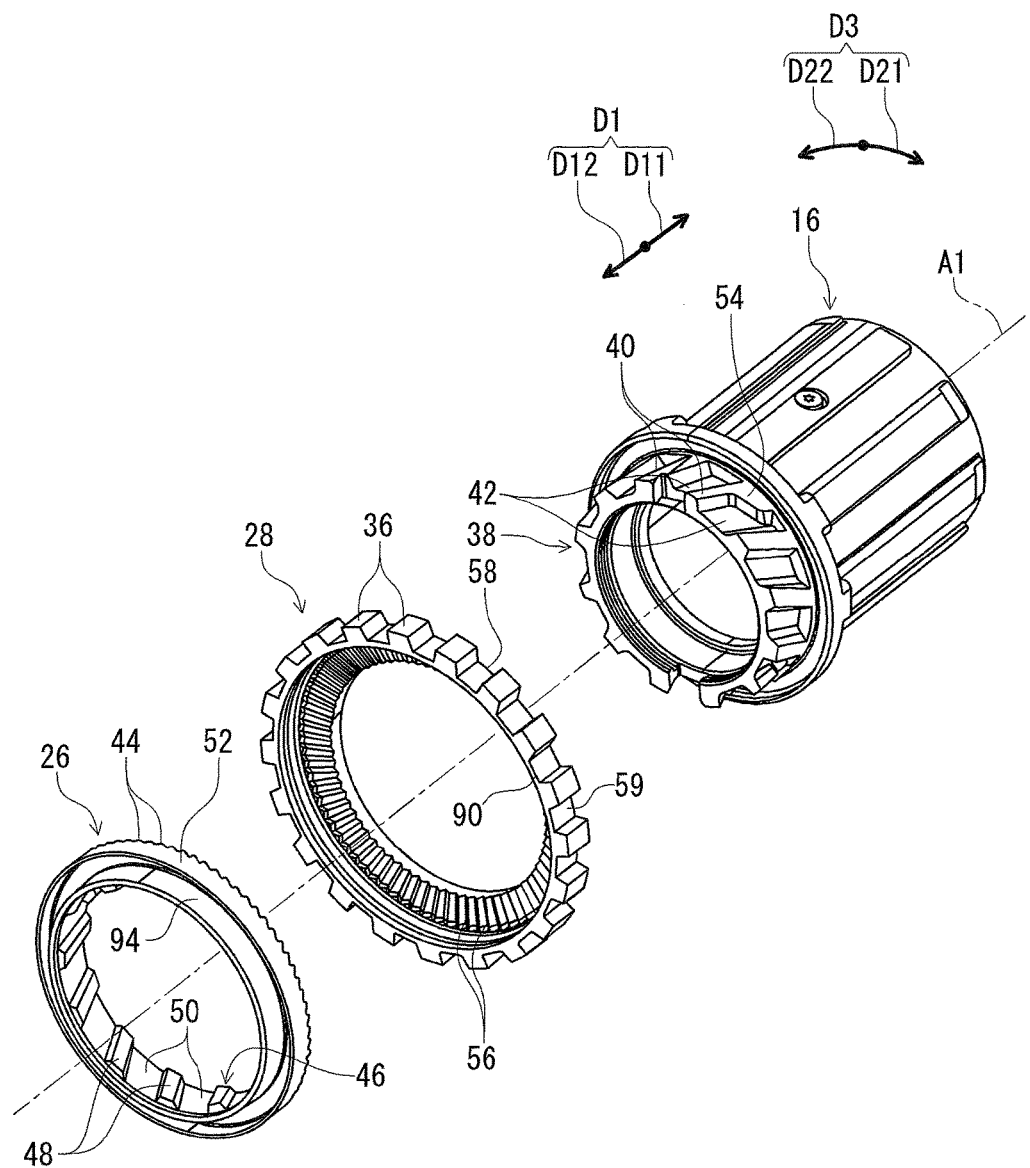
FIG. 6 is an exploded perspective view of a part of the bicycle hub assembly illustrated in FIG. 1.

As seen in FIGS. 5 and 6, the sprocket support body 16 includes a first helical spline 38. The first helical spline 38 includes first spline teeth 40 and first spline grooves 42 defined between adjacent two teeth of the first spline teeth 40. The first ratchet member 26 comprises at least one first ratchet tooth 44 and a second helical spline 46 engaged with the first helical spline 38. In this embodiment, the first ratchet member 26 comprises a plurality of first ratchet teeth 44. The first ratchet teeth 44 are arranged in the circumferential direction D3. The second helical spline 46 includes second spline teeth 48 and second spline grooves 50 defined between adjacent two teeth of the second spline teeth 48. The second spline teeth 48 are respectively provided in the first spline grooves 42. The first spline teeth 40 are respectively provided in the second spline grooves 50.

In this embodiment, the first ratchet member 26 includes a first ratchet body 52. The first ratchet body 52 has an annular shape. The first ratchet teeth 44 are provided on an axial side of the first ratchet body 52. The first ratchet teeth 44 radially extend relative to the rotational axis A1. The first ratchet teeth 44 provide a serration on the axial side of the first ratchet body 52. The second helical spline 46 is provided on an inner periphery of the first ratchet body 52. The second spline teeth 48 are provided on the inner periphery of the first ratchet body 52.

As seen in FIG. 6, the sprocket support body 16 includes guiding portions 54. Only one of the guiding portions 54 is illustrated in FIG. 6. The guiding portions 54 are configured to guide the first ratchet member 26 toward the hub shell 14 during coasting or freewheeling. The guiding portions 54 are configured to move the first ratchet member 26 away from the second ratchet member 28 in the axial direction D1. The guiding portion 54 extends from one of the first ratchet teeth 44 in at least the circumferential direction D3. While the guiding portion 54 is integrally provided with the first spline teeth 40 as a one-piece unitary member in this embodiment, the guiding portion 54 can be a separate member from the first spline teeth 40.

The second ratchet member 28 comprises at least one second ratchet tooth 56. The at least one second ratchet tooth 56 is engageable with the at least one first ratchet tooth 44. In this embodiment, the second ratchet member 28 comprises a plurality of second ratchet teeth 56. The second ratchet teeth 56 are arranged in the circumferential direction D3. The second ratchet teeth 56 are engageable with the first ratchet teeth 44. The first ratchet member 26 and the second ratchet member 28 rotate together in a state where the second ratchet teeth 56 are engaged with the first ratchet teeth 44.

In this embodiment, the second ratchet member 28 includes a second ratchet body 58. The second ratchet body 58 has an annular shape. The second ratchet member 28 includes an outer peripheral surface 59. In this embodiment, the second ratchet body 58 includes the outer peripheral surface 59. The at least one second tooth 36 is provided on the outer peripheral surface 59 of the second ratchet member 28. In this embodiment, the second teeth 36 are provided on the outer peripheral surface 59 of the second ratchet member 28.

The second ratchet teeth 56 are provided on an axial side of the second ratchet body 58. The second ratchet teeth 56 radially extend relative to the rotational axis A1. The second ratchet teeth 56 provide a serration on the axial side of the second ratchet body 58. The second teeth 36 extend radially outwardly from the second ratchet body 58.

As seen in FIG. 3, the bicycle hub assembly 10 comprises a biasing member 60. The biasing member 60 is provided between the hub shell 14 and the first ratchet member 26 in the axial direction D1 parallel to the rotational axis A1 to bias the first ratchet member 26 toward the second ratchet member 28. In this embodiment, for example, the biasing member 60 is a compression spring.

Figure 7:
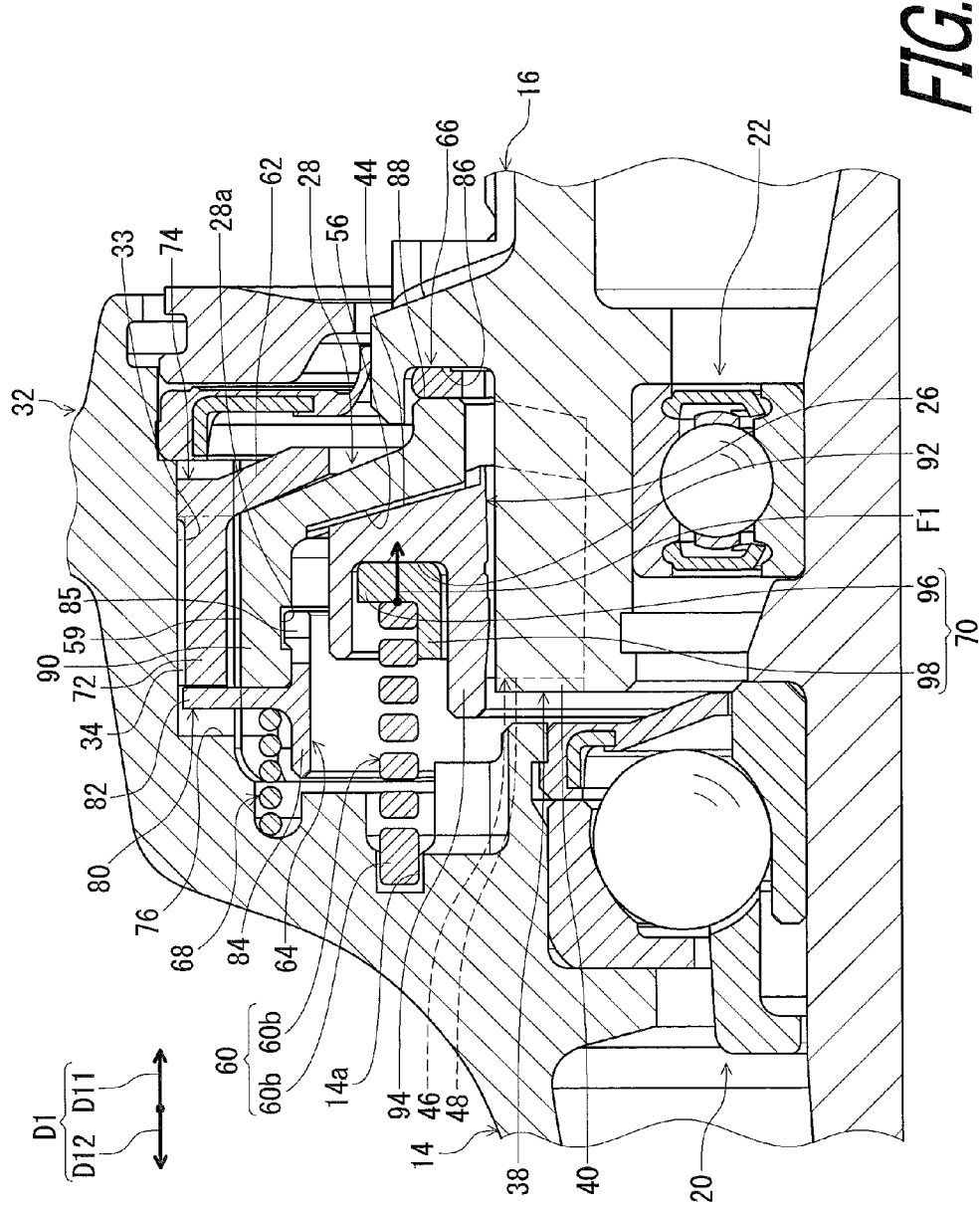
FIG. 7 is a partial cross-sectional view of the bicycle hub assembly illustrated in FIG. 1.

As seen in FIG. 7, the biasing member 60 is compressed between the hub shell 14 and the first ratchet member 26 in the axial direction D1. The biasing member 60 biases the first ratchet member 26 toward the second ratchet member 28 to maintain an engagement state where the first ratchet member 26 and the second ratchet member 28 are engaged with each other via the first ratchet teeth 44 and the second ratchet teeth 56.

Preferably, the biasing member 60 is mounted to the hub shell 14 to rotate together with the hub shell 14 about the rotational axis A1 (FIG. 3). The biasing member 60 includes a coiled body 60a and a connecting end 60b. The hub shell 14 includes a connecting hole 14a. The connecting end 60b is provided in the connecting hole 14a so that the biasing member 60 rotates together with the hub shell 14 about the rotational axis A1.

As seen in FIG. 3, the bicycle hub assembly 10 comprises a spacer 62, a supporting member 64, a sliding member 66, an additional biasing member 68, and a receiving member 70. However, it is possible to omit at most four of the spacer 62, the supporting member 64, the sliding member 66, the additional biasing member 68, and the receiving member 70 from the bicycle hub assembly 10.

Figure 8:
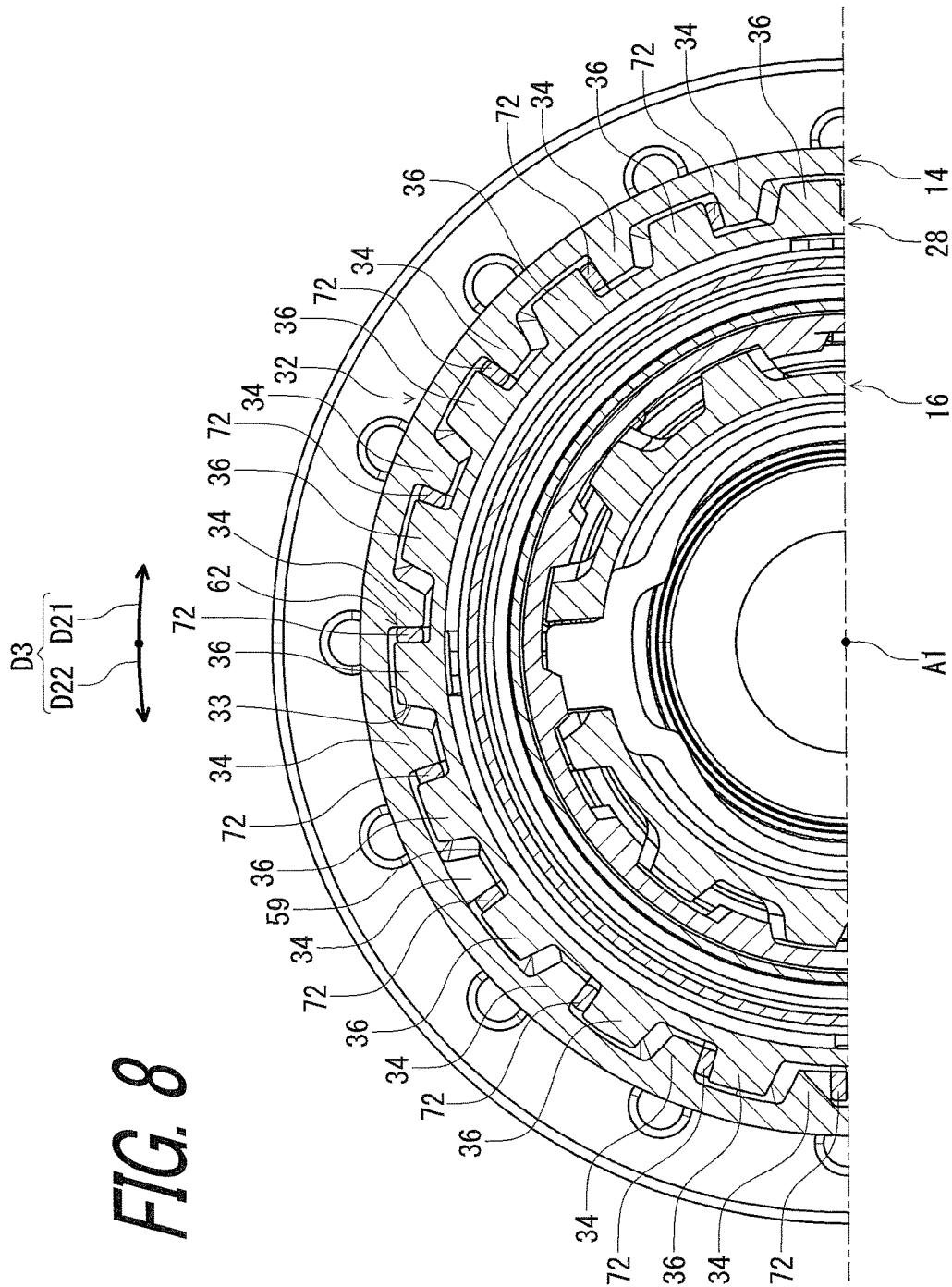
FIG. 8 is a cross-sectional view of the bicycle hub assembly taken along line VIII-VIII of FIG. 2.

As seen in FIGS. 7 and 8, the spacer 62 is at least partly provided between the at least one first tooth 34 and the at least one second tooth 36 in the circumferential direction D3 defined about the rotational axis A1. In this embodiment, the spacer 62 is partly provided between the first teeth 34 and the second teeth 36 in the circumferential direction D3. However, the spacer 62 can be entirely provided between the first teeth 34 and the second teeth 36 in the circumferential direction D3.

Figure 9:
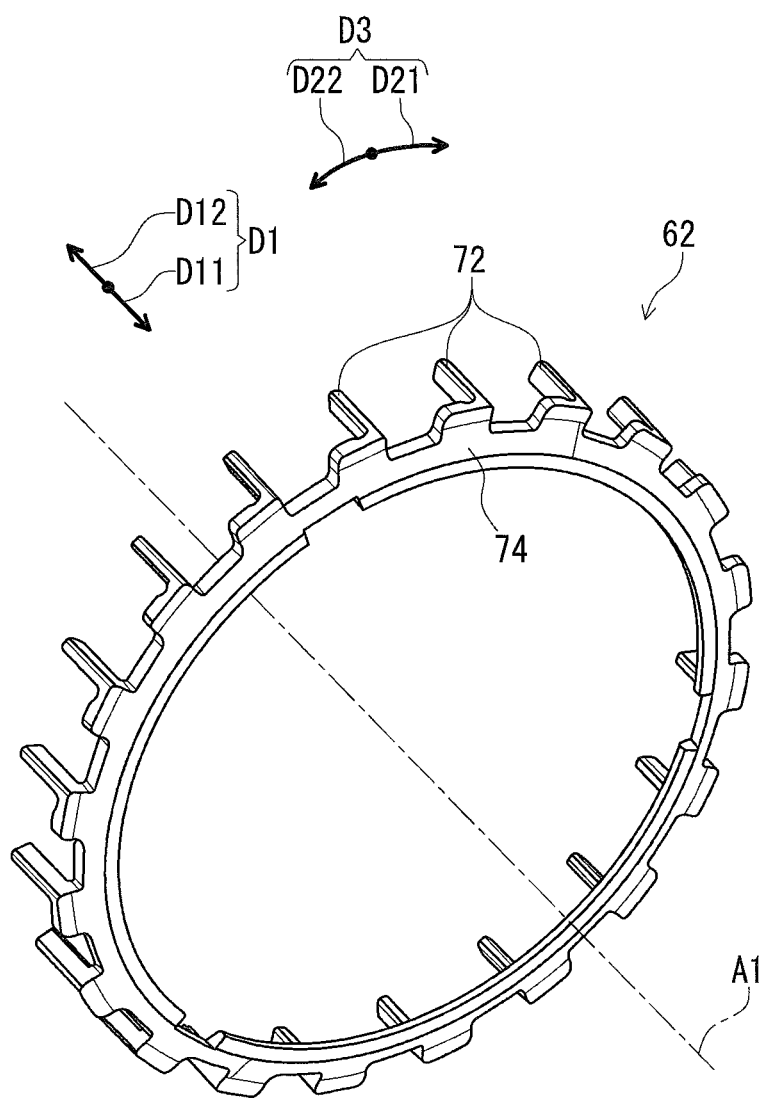
FIG. 9 is a perspective view of a spacer of the bicycle hub assembly illustrated in FIG. 1.
Figure 10:
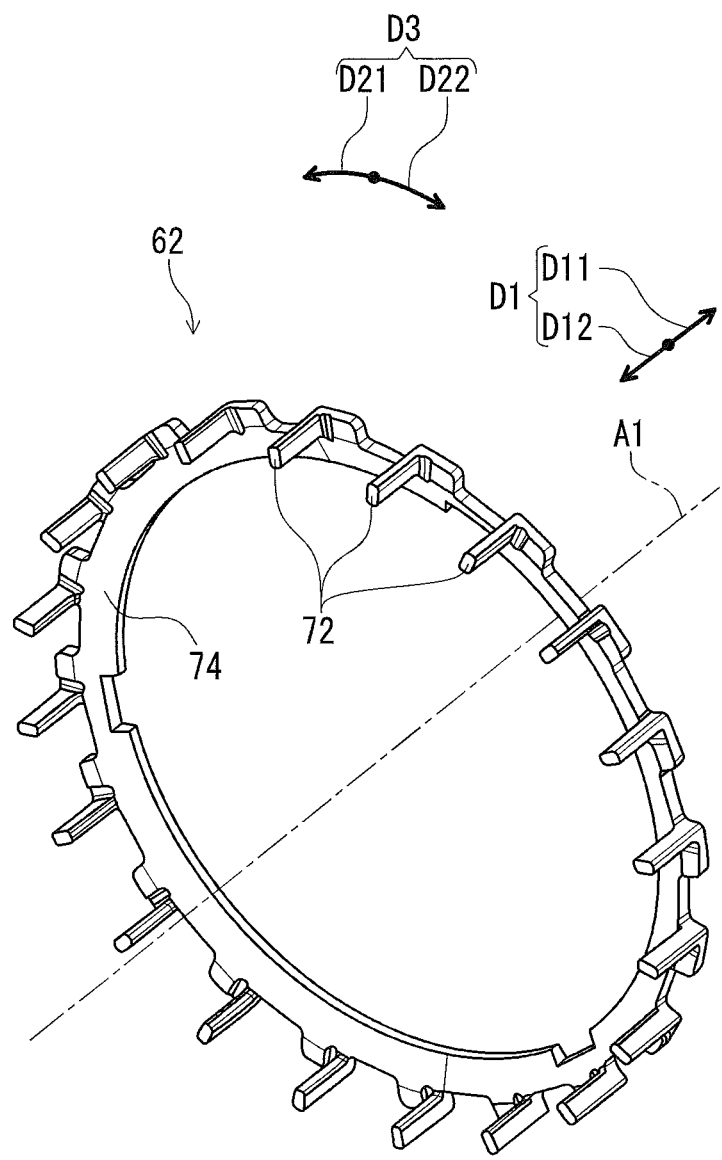
FIG. 10 is a perspective view of a spacer of the bicycle hub assembly illustrated in FIG. 1.

As seen in FIGS. 8 to 10, the spacer 62 includes at least one intermediate portion 72 provided between the at least one first tooth 34 and the at least one second tooth 36. The at least one intermediate portion 72 provided between the at least one first tooth 34 and the at least one second tooth 36 in the circumferential direction D3. In this embodiment, the spacer 62 includes a plurality of intermediate portions 72 respectively provided between the first teeth 34 and the second teeth 36 in the circumferential direction D3. While the spacer 62 includes the intermediate portions 72 in this embodiment, the spacer 62 can include one intermediate portion 72.

Figure 11:
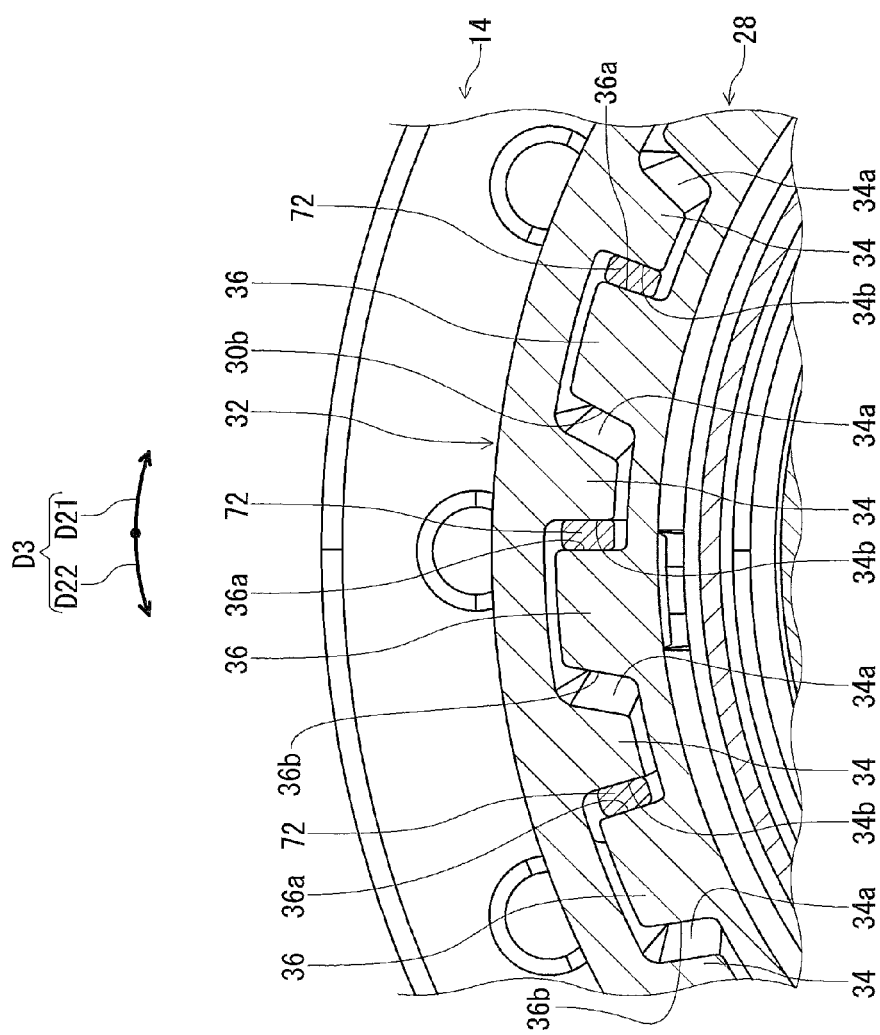
FIG. 11 is a partial cross-sectional view of the bicycle hub assembly taken along line VIII-VIII of FIG. 2.

As seen in FIG. 11, the first tooth 34 includes a first surface 34a and a second tooth 34b. The first surface 34a faces in the driving rotational direction D21. The second surface 34b faces in the opposite rotational direction D22. The second tooth 36 includes a third surface 36a and a fourth surface 36b. The third surface 36a faces in the driving rotational direction D21. The fourth surface 36b faces in the opposite rotational direction D22. The intermediate portion 72 is provided between the second surface 34b and the third surface 36a in the circumferential direction D3. However, the intermediate portion 72 can be provided between the first surface 34a and the fourth surface 36b in the circumferential direction D3.

As seen in FIGS. 9 and 10, the spacer 62 includes an annular portion 74. The at least one intermediate portion 72 extends from the annular portion 74 in the axial direction D1 parallel to the rotational axis A1. The intermediate portions 72 extend from the annular portion 74 in the axial direction D1. While the spacer 62 includes the annular portion 74 in this embodiment, the annular portion 74 can be omitted from the spacer 62.

The spacer 62 including a non-metallic material. In this embodiment, the non-metallic material includes a resin material. Examples of the resin material include synthetic resin. The non-metallic material can include a material other than the resin material instead of or in addition to the resin material. While the intermediate portions 72 and the annular portion 74 are integrally provided with each other as a one-piece unitary member in this embodiment, at least one of the intermediate portions 72 can be a separate portion from the annular portion 74.

As seen in FIGS. 7 and 8, the outer peripheral surface 59 faces the inner peripheral surface 33 of the hub shell 14 in a radial direction perpendicular to the rotational axis A1 (FIG. 8). The at least one intermediate portion 72 is provided between the inner peripheral surface 33 of the hub shell 14 and the outer peripheral surface 59 of the second ratchet member 28 in the radial direction. In this embodiment, the intermediate portions 72 are provided between the inner peripheral surface 33 of the hub shell 14 and the outer peripheral surface 59 of the second ratchet member 28 in the radial direction.

As seen in FIG. 7, the supporting member 64 is provided between the hub shell 14 and the spacer 62 in the axial direction D1 parallel to the rotational axis A1. The supporting member 64 is provided between the hub shell 14 and the second ratchet member 28 in the axial direction D1. The hub shell 14 includes a hub axial surface 76 facing in the axial direction D1. The supporting member 64 is provided between the hub axial surface 76 and the second ratchet member 28 in the axial direction D1.

Figure 12:
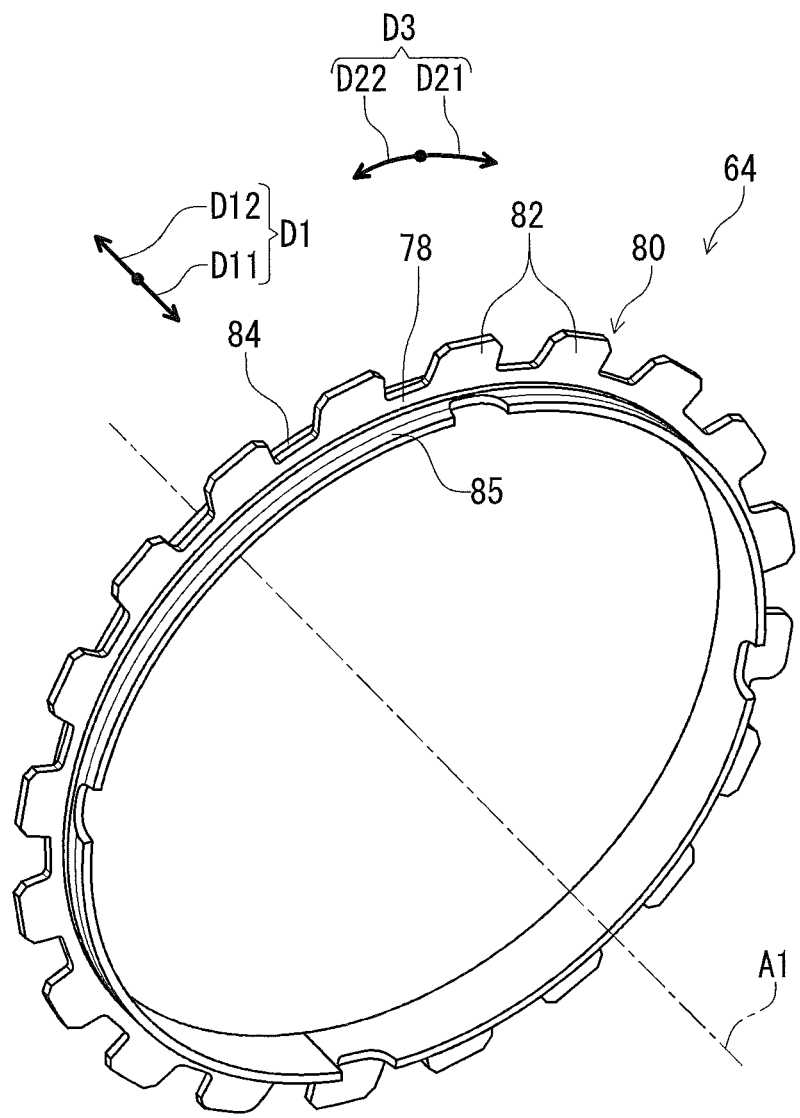
FIG. 12 is a perspective view of a supporting member of the bicycle hub assembly illustrated in FIG. 1.
Figure 13:
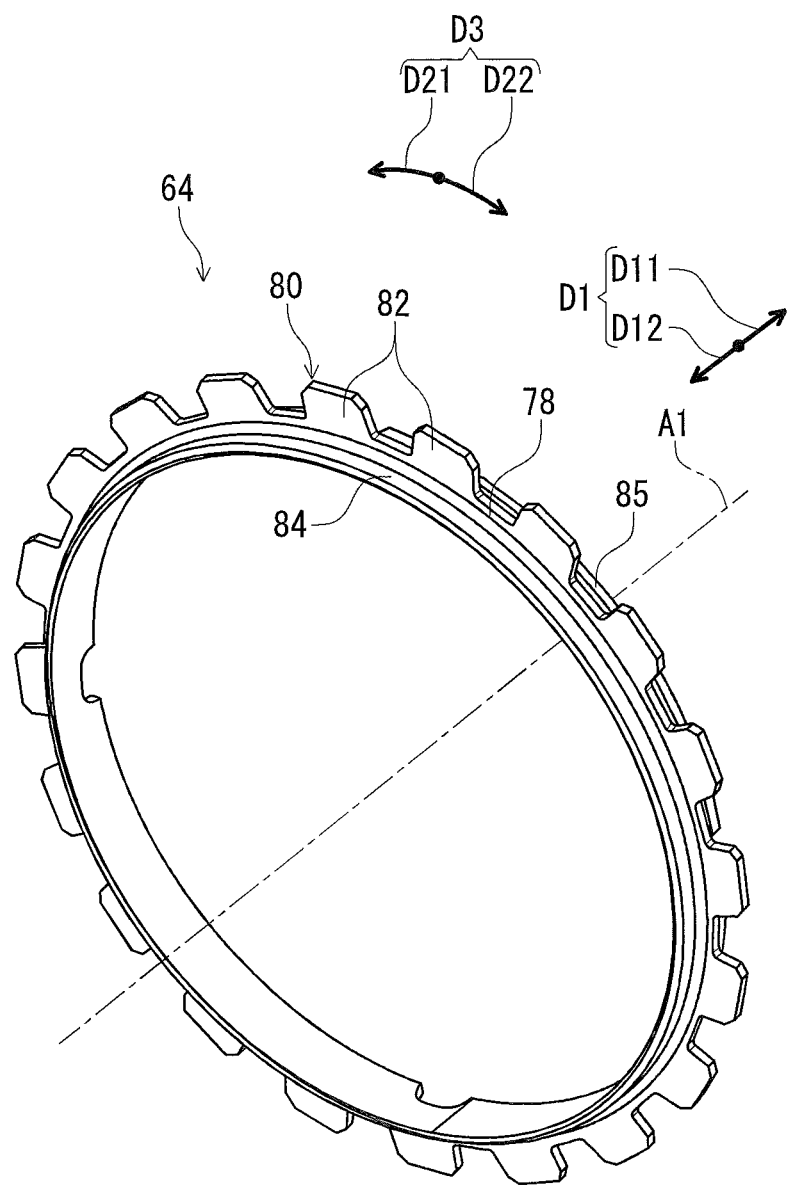
FIG. 13 is a perspective view of a supporting member of the bicycle hub assembly illustrated in FIG. 1.

As seen in FIGS. 12 and 13, the supporting member 64 includes an annular base 78 and an axially supporting portion 80. The axially supporting portion 80 extends radially outwardly from the annular base 78. As seen in FIG. 7, the annular base 78 is attached to the second ratchet member 28. The axially supporting portion 80 faces the at least one inter mediate portion 72 in the axial direction D1. In this embodiment, as seen in FIGS. 12 and 13, the axially supporting portion 80 includes protruding parts 82. The protruding parts 82 are arranged in the circumferential direction D3 and extend radially outwardly from the annular base 78. As seen in FIG. 7, the protruding parts 82 respectively face the intermediate portions 72 in the axial direction D1. While the axially supporting portion 80 includes the protruding parts 82 in this embodiment, the axially supporting portion 80 can have other shapes such as an annular shape. While the axially supporting portion 80 includes the protruding parts 82 in this embodiment, the axially supporting portion 80 can include one protruding part 82.

As seen in FIGS. 12 and 13, the supporting member 64 includes a radially supporting portion 84. The radially supporting portion 84 extends from the annular base 78 in the axial direction D1. As seen in FIG. 7, the radially supporting portion 84 is provided radially inwardly of the additional biasing member 68. While the radially supporting portion 84 has an annular shape in this embodiment, the shape of the radially supporting portion 84 is not limited to this embodiment.

As seen in FIGS. 12 and 13, the supporting member 64 includes an attachment portion 85. The attachment portion 85 is provided on an opposite side of the radially supporting portion 84 relative to the annular base 78. The attachment portion 85 has a substantially annular shape and extends from the annular base 78 in the axial direction D1.

As seen in FIG. 7, the second ratchet member 28 includes an attachment groove 28a having an annular shape. The attachment portion 85 is engaged with the attachment groove 28a. The supporting member 64 is secured to the second ratchet member 28 by the attachment portion 85 and the attachment groove 28a.

The supporting member 64 includes a non-metallic material. In this embodiment, the non-metallic material includes a resin material. The non-metallic material can include a material other than the resin material instead of or in addition to the resin material. The annular base 78, the axially supporting portion 80, the radially supporting portion 84, and the attachment portion 85 are integrally provided with each other as a one-piece unitary member. However, at least one of the axially supporting portion 80, the radially supporting portion 84, and the attachment portion 85 can be a separate portion from the annular base 78.

As seen in FIG. 7, the sliding member 66 is provided between the sprocket support body 16 and the second ratchet member 28 in the axial direction D1 parallel to the rotational axis A1. The sprocket support body 16 includes a first axial surface 86 facing in the axial direction D1. The second ratchet member 28 includes a second axial surface 88 facing in the axial direction D1. The sliding member 66 is provided between the first axial surface 86 and the second axial surface 88 in the axial direction D1. The second ratchet member 28 is provided between the first ratchet member 26 and the sliding member 66 in the axial direction D1.

Figure 14:
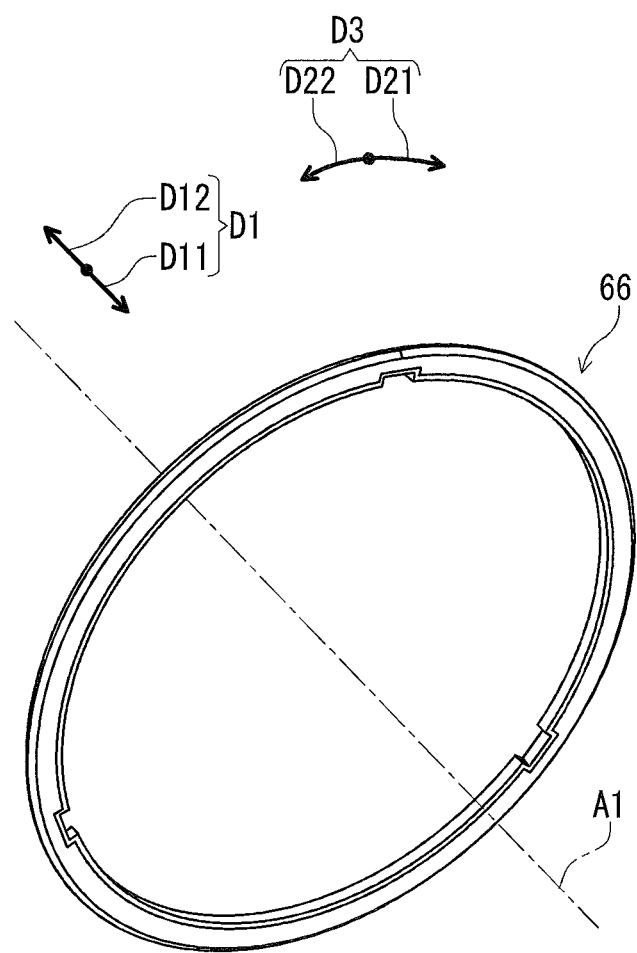
FIG. 14 is a perspective view of a sliding member of the bicycle hub assembly illustrated in FIG. 1.

In this embodiment, as seen in FIG. 14, the sliding member 66 has an annular shape. However, the shape of the sliding member 66 is not limited to the annular shape. The sliding member 66 includes a non-metallic material. In this embodiment, the non-metallic material includes a resin material. The non-metallic material can include a material other than the resin material instead of or in addition to the resin material.

As seen in FIG. 7, the additional biasing member 68 is provided between the hub shell 14 and the second ratchet member 28 in the axial direction D1 to bias the second ratchet member 28 toward the second ratchet member 28. The additional biasing member 68 is provided radially outwardly of the biasing member 60. The additional biasing member 68 is provided radially outwardly of the at least one second ratchet tooth 56. In this embodiment, the additional biasing member 68 is provided radially outwardly of the second ratchet teeth 56.

As seen in FIGS. 6 and 7, the second ratchet member 28 includes a cylindrical element 90 extending in the axial direction D1. The at least one second tooth 36 extends radially outwardly from the cylindrical element 90. In this embodiment, the second ratchet body 58 includes the cylindrical element 90. The second teeth 36 extend radially outwardly from the cylindrical element 90.

As seen in FIG. 7, the additional biasing member 68 is provided between the hub shell 14 and the cylindrical element 90 in the axial direction D1. The supporting member 64 is provided between the second ratchet member 28 and the additional biasing member 68 in the axial direction D1. The annular base 78 is provided between the second ratchet member 28 and the additional biasing member 68 in the axial direction D1. The additional biasing member 68 is provided radially outwardly of the radially supporting portion 84.

The receiving member 70 is provided between the first ratchet member 26 and the biasing member 60 in the axial direction D1. The first ratchet member 26 includes a first receiving surface 92 facing in the axial direction D1. The receiving member 70 is provided between the first receiving surface 92 and the biasing member 60 in the axial direction D1.

As seen in FIGS. 6 and 7, the first ratchet member 26 includes a cylindrical part 94 extending from the first receiving surface 92 in the axial direction D1. The receiving member 70 is provided radially outwardly of the cylindrical part 94.

Figure 15:
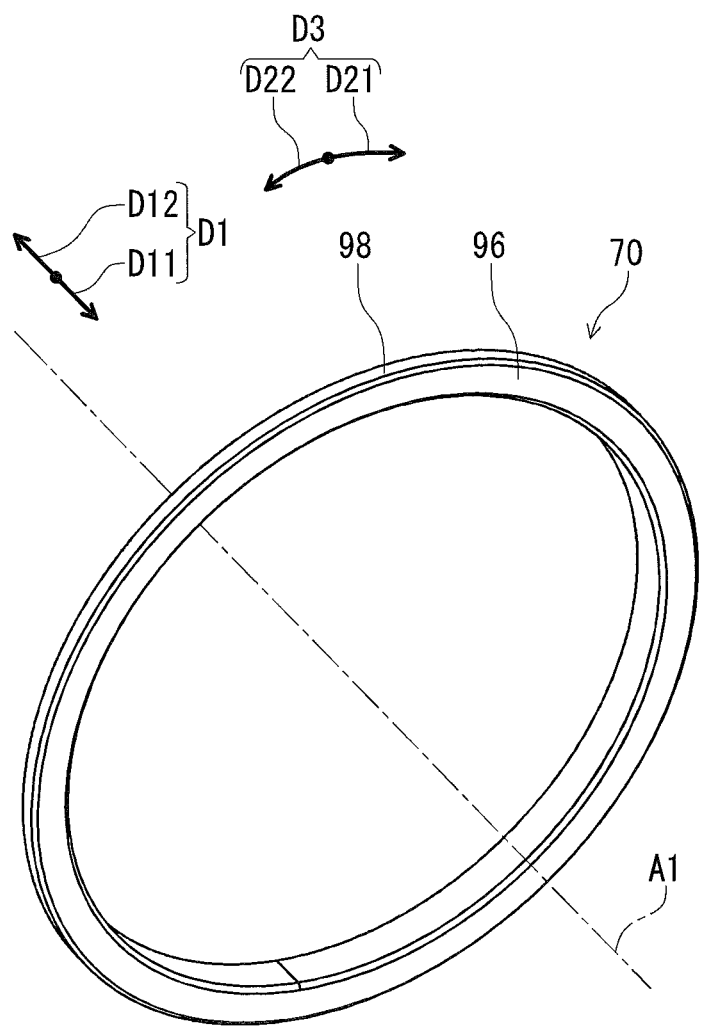
FIG. 15 is a perspective view of a receiving member of the bicycle hub assembly illustrated in FIG. 1.
Figure 16:
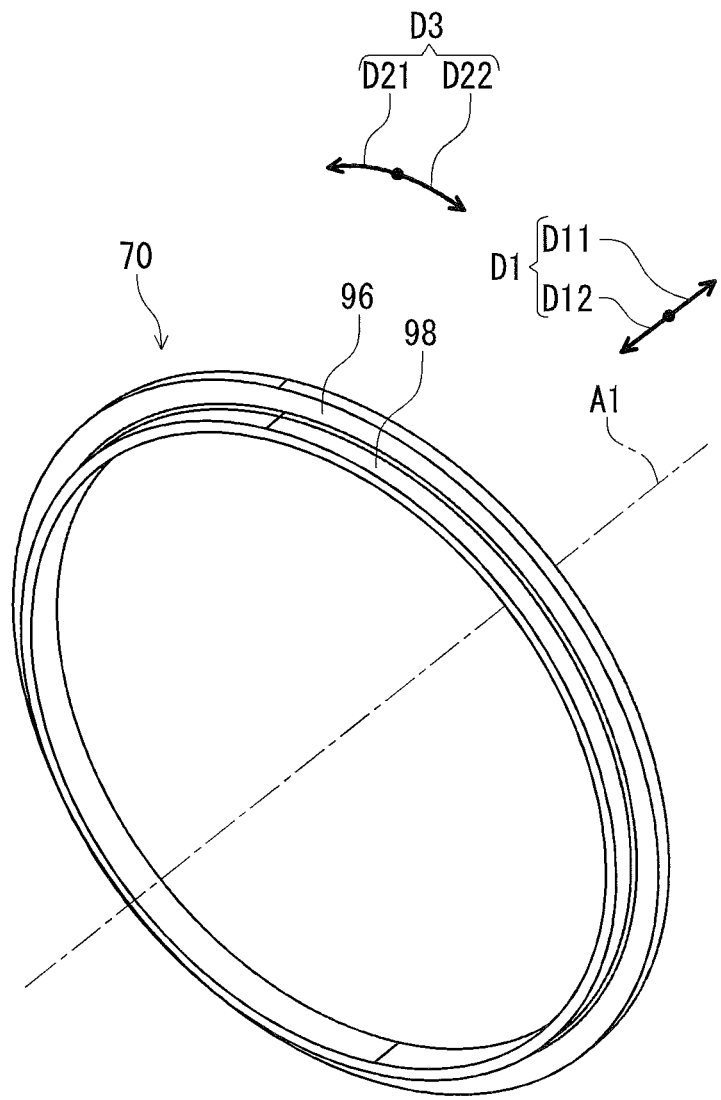
FIG. 16 is a perspective view of the receiving member of the bicycle hub assembly illustrated in FIG. 1.

As seen in FIGS. 15 and 16, the receiving member 70 includes an axially receiving part 96 and a radially receiving part 98. In this embodiment, each of the axially receiving part 96 and the radially receiving part 98 has an annular shape. As seen in FIG. 7, the axially receiving part 96 is provided between the first receiving surface 92 and the biasing member 60 in the axial direction D1. The radially receiving part 98 extends from the axially receiving part 96 in the axial direction D1. The radially receiving part 98 is provided between the cylindrical part 94 and the biasing member 60 in the radial direction perpendicular to the rotational axis A1.

The receiving member 70 includes a non-metallic material. In this embodiment, the non-metallic material includes a resin material. The non-metallic material can include a material other than the resin material instead of or in addition to the resin material. The axially receiving part 96 and the radially receiving part 98 are integrally provided with each other as a one-piece unitary member. However, the axially receiving part 96 can be a separate member from the radially receiving part 98.

The action of the bicycle hub assembly 10 will be described in detail below referring to FIGS. 7, 17, and 18.

As seen in FIG. 7, the axial direction D1 includes a first axial direction D11 and a second axial direction D12 opposite to the first axial direction D11. A biasing force F1 is applied from the biasing member 60 to the receiving member 70 in the first axial direction D11. The biasing force F1 of the biasing member 60 biases the receiving member 70, the first ratchet member 26, the second ratchet member 28, and the sliding member 66 toward the sprocket support body 16 in the first axial direction D11. This brings the first ratchet teeth 44 into engagement with the second ratchet teeth 56.

Figure 17:
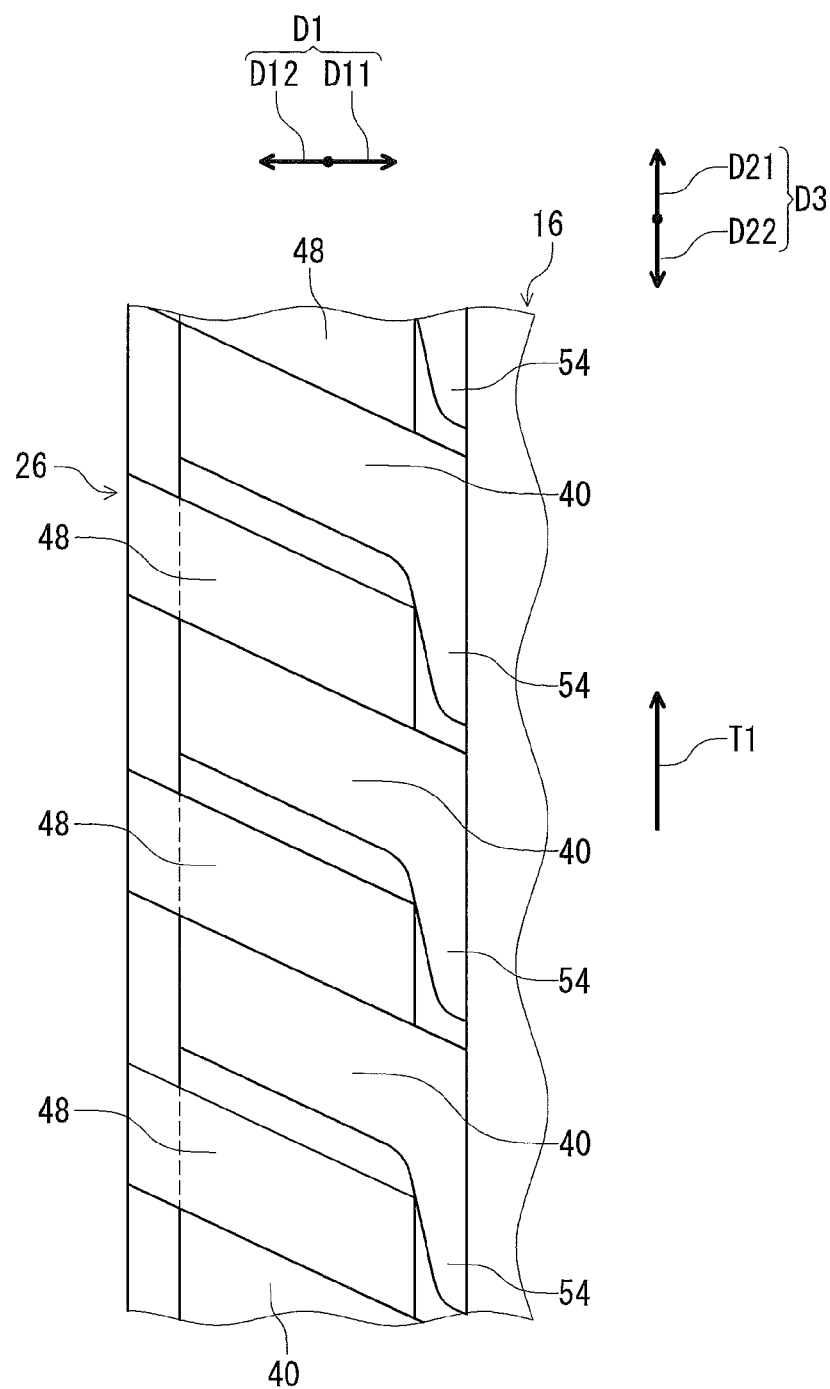
FIG. 17 is a schematic diagram showing an action of a first ratchet member and a sprocket support body of the bicycle hub assembly illustrated in FIG. 1 (pedaling).

Furthermore, as seen in FIG. 17, when a pedaling torque T1 is input to the sprocket support body 16 in the driving rotational direction D21, the second spline teeth 48 are guided by the first spline teeth 40 relative to the sprocket support body 16 in the first axial direction D11. This strongly brings the first ratchet teeth 44 into engagement with the second ratchet teeth 56. In this state, the pedaling torque T1 is transmitted from the sprocket support body 16 to the hub shell 14 (FIG. 7) via the first ratchet member 26 and the second ratchet member 28 (FIG. 7).

Figure 18:
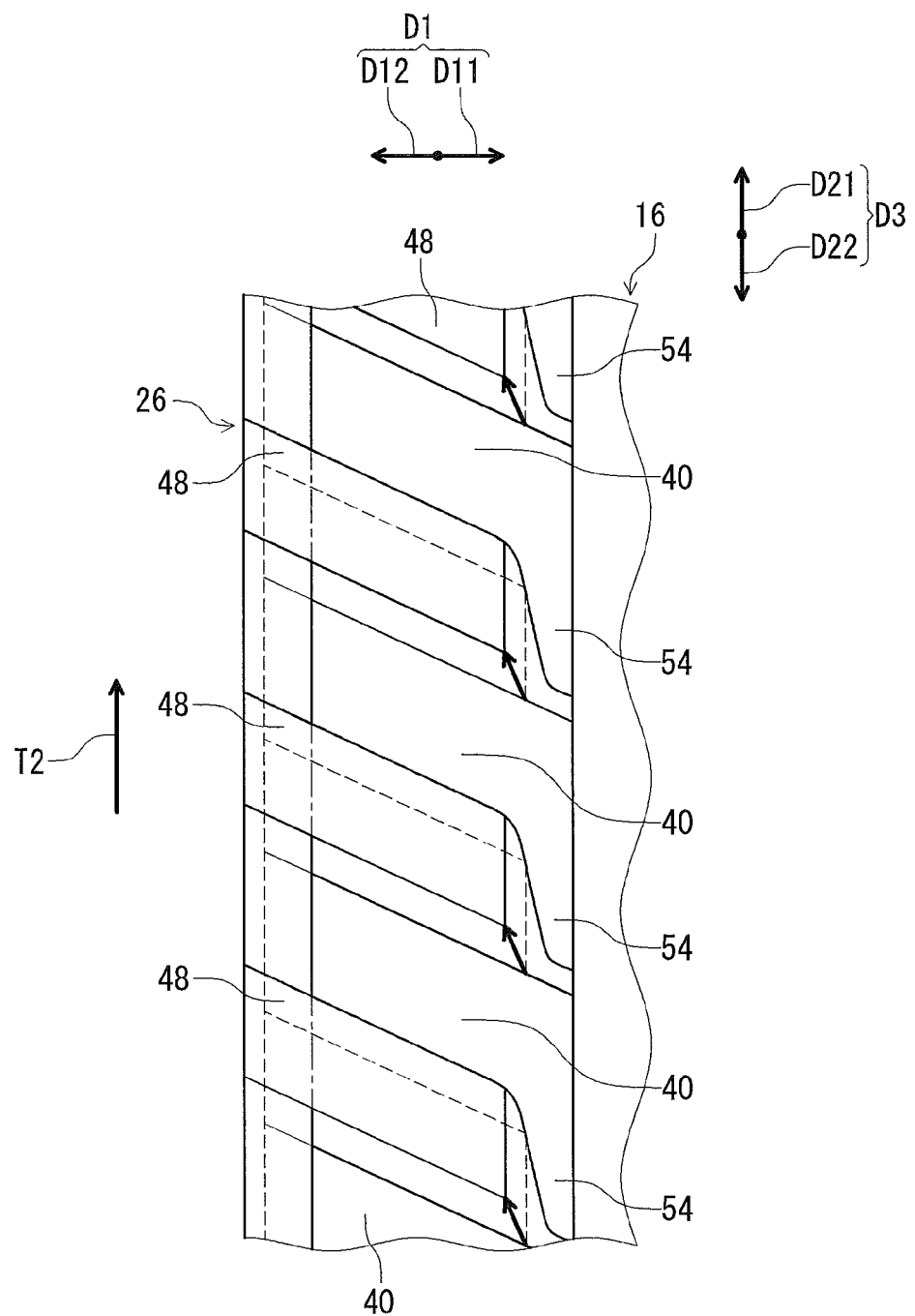
FIG. 18 is a schematic diagram showing an action of the first ratchet member and the sprocket support body of the bicycle hub assembly illustrated in FIG. 1 (coasting).

As seen in FIG. 18, a coasting torque T2 is applied to the hub shell 14 in the driving rotational direction D21 during coasting. The coasting torque T2 is transmitted from the hub shell 14 (FIG. 7) to the first ratchet member 26 via the second ratchet member 28 (FIG. 7). At this time, the second spline teeth 48 are guided by the first spline teeth 40 relative to the support sprocket body 16 in the second axial direction D12. This moves the first ratchet member 26 relative to the sprocket support body 16 in the second axial direction D12 against the biasing force F1. Thus, the first ratchet member 26 is moved away from the second ratchet member 28 in the second axial direction D12, causing the engagement between the first ratchet teeth 44 and the second ratchet teeth 56 to be weaker. This allows the second ratchet member 28 to rotate relative to the first ratchet member 26 in the driving rotational direction D21, preventing the coasting torque T2 from being transmitted from the hub shell 14 to the sprocket support body 16 via the first ratchet member 26 and the second ratchet member 28. At this time, the first ratchet teeth 44 slide with the second ratchet teeth 56 in the circumferential direction D3.

The bicycle hub assembly 10 has the following features.

(1) The spacer 62 is at least partly provided between the at least one first tooth 34 and the at least one second tooth 36 in a circumferential direction D3 defined about the rotational axis A1. The spacer 62 includes the non-metallic material. Accordingly, it is possible to reduce or prevent friction sound caused by direct contact between the at least one first tooth 34 and the at least one second tooth 36.

(2) The at least one intermediate portion 72 is provided between the at least one first tooth 34 and the at least one second tooth 36. Accordingly, it is possible to effectively reduce or prevent the friction sound caused by direct contact between the at least one first tooth 34 and the at least one second tooth 36.

(3) The at least one intermediate portion 72 extends from the annular portion 74 in the axial direction D1 parallel to the rotational axis A1. Accordingly, it is possible to easily detach or attach the at least one intermediate portion 72 from or to the at least one first tooth 34 and the at least one second tooth 36.

(4) Since the non-metallic material includes a resin material, it is possible to effectively reduce or prevent the friction sound caused by direct contact between the at least one first tooth 34 and the at least one second tooth 36 with suppressing an increase in weight of the bicycle hub assembly 10.

(5) The at least one first tooth 34 is provided on the inner peripheral surface 33. The at least one second tooth 36 is provided on the outer peripheral surface 59 of the second ratchet member 28. Accordingly, it is possible to make the bicycle hub assembly 10 compact.

(6) The at least one intermediate portion 72 is provided between the inner peripheral surface 33 of the hub shell 14 and the outer peripheral surface 59 of the second ratchet member 28 in the radial direction. Accordingly, it is possible to effectively reduce or prevent the friction sound caused by direct contact between the at least one first tooth 34 and the at least one second tooth 36 with making the bicycle hub assembly 10 compact.

(7) The supporting member 64 is provided between the hub shell 14 and the spacer 62 in the axial direction D1 parallel to the rotational axis A1. Accordingly, it is possible to prevent the spacer 62 from being removed from the hub shell 14 even when the spacer 62 is broken.

(8) The supporting member 64 is provided between the hub shell 14 and the second ratchet member 28 in the axial direction D1. Accordingly, it is possible to effectively prevent the spacer 62 from being removed from the hub shell 14 even when the spacer 62 is broken.

(9) The supporting member 64 is provided between the hub axial surface 76 and the second ratchet member 28 in the axial direction D1. Accordingly, it is possible effectively prevent the spacer 62 from being removed from the hub shell 14 even when the spacer 62 is broken.

(10) The supporting member 64 includes the annular base 78 and the supporting portion 80. Accordingly, it is possible to effectively prevent the at least one intermediate portion 72 of the spacer 62 from being removed from the hub shell 14 even when the spacer 62 is broken.

(11) Since the supporting member 64 includes a non-metallic material, it is possible to prevent the spacer 62 from being removed from the hub shell 14 even when the spacer 62 is broken with suppressing an increase in weight of the bicycle hub assembly 10.

(12) The sliding member 66 is provided between the sprocket support body 16 and the second ratchet member 28 in the axial direction D1 parallel to the rotational axis A1. The sliding member 66 includes a non-metallic material. Accordingly, it is possible to reduce or prevent friction sound caused by direct contact between the sprocket support body 16 and the second ratchet member 28.

(13) The sliding member 66 is provided between the first axial surface 86 and the second axial surface 88 in the axial direction D1. Accordingly, it is possible to reduce or prevent friction sound caused by direct contact between the first axial surface 86 and the second axial surface 88.

(14) Since the sliding member 66 has an annular shape, it is possible to effectively reduce or prevent friction sound caused by direct contact between the sprocket support body 16 and the second ratchet member 28 with securing strength of the sliding member 66.

(15) The second ratchet member 28 is provided between the first ratchet member 26 and the sliding member 66 in the axial direction D1. Accordingly, the sliding member 66 can receive an axial force applied from the first ratchet member 26 to the second ratchet member 28 in the axial direction D1.

(16) Since the sliding member 66 includes a non-metallic material, it is possible to reduce or prevent friction sound caused by direct contact between the sprocket support body 16 and the second ratchet member 28 with suppressing an increase in weight of the bicycle hub assembly 10.

(17) The additional biasing member 68 is provided between the hub shell 14 and the second ratchet member 28 in the axial direction D1 to bias the second ratchet member 28 toward the sprocket support body 16. Accordingly, it is possible to stabilize an orientation of the second ratchet member 28 relative to the hub shell 14 by the additional biasing member 68. This can reduce or prevent friction sound caused by direct contact between the hub shell 14 and the second ratchet member 28.

(18) The additional biasing member 68 is provided radially outwardly of the biasing member 60. Accordingly, it is possible to effectively stabilize the orientation of the second ratchet member 28 relative to the hub shell 14 by the additional biasing member 68.

(19) The additional biasing member 68 is provided radially outwardly of the at least one second ratchet tooth 56. Accordingly, it is possible to utilize a space provided radially outwardly of the at least one sound ratchet tooth as a space in which the additional biasing member 68.

(20) The additional biasing member 68 is provided between the hub shell 14 and the cylindrical element 90 in the axial direction D1. Accordingly, it is possible to effectively stabilize the orientation of the second ratchet member 28 relative to the hub shell 14 by the additional biasing member 68.

(21) The supporting member 64 is provided between the second ratchet member 28 and the additional biasing member 68 in the axial direction D1. Accordingly, it is possible to stabilize an orientation of the additional biasing member 68 relative to the hub shell 14 by the supporting member 64.

(22) The supporting member 64 includes the annular base 78 and the radially supporting portion 84. Accordingly, it is possible to further stabilize an orientation of the additional biasing member 68 relative to the hub shell 14 by the supporting member 64.

(23) Since the supporting member 64 includes a non-metallic material, it is possible to effectively stabilize the orientation of the additional biasing member 68 relative to the hub shell 14 by the supporting member 64 with suppressing an increase in weight of the bicycle hub assembly 10.

(24) The receiving member 70 is provided between the first ratchet member 26 and the biasing member 60 in the axial direction D1. Accordingly, it is possible to stabilize an orientation of the biasing member 60 relative to the hub shell 14 by the receiving member 70. This can stabilize a motion of the first ratchet member 26, preventing uneven wear of at least one of the first ratchet member 26 and the second ratchet member 28.

(25) Since the receiving member 70 is provided between the first receiving surface 92 and the biasing member 60 in the axial direction D1, it is possible to stabilize an orientation of the receiving member 70 relative to the first ratchet member 26. This can stabilize the orientation of the biasing member 60 relative to the hub shell 14. Accordingly, it is possible to effectively prevent uneven wear of at least one of the first ratchet member 26 and the second ratchet member 28.

(26) Since the receiving member 70 is provided radially outwardly of the cylindrical part 94, it is possible to further stabilize the orientation of the receiving member 70 relative to the first ratchet member 26. This can further stabilize the orientation of the biasing member 60 relative to the hub shell 14. Accordingly, it is possible to effectively prevent uneven wear of at least one of the first ratchet member 26 and the second ratchet member 28.

(27) Since the radially receiving part 98 is provided between the cylindrical part 94 and the biasing member 60 in the radial direction perpendicular to the rotational axis A1, it is possible to further stabilize the orientation of the biasing member 60 relative to the hub shell 14. Accordingly, it is possible to more effectively prevent uneven wear of at least one of the first ratchet member 26 and the second ratchet member 28.

(28) Since the receiving member 70 includes a non-metallic material, it is possible to reduce or prevent wear of at least one of the biasing member 60 and the first ratchet member 26 with suppressing an increase in weight of the bicycle hub assembly 10.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
a hub axle defining a rotational axis;
a hub shell rotatably mounted on the hub axle to rotate about the rotational axis, the hub shell including at least one first tooth;
a sprocket support body rotatably mounted on the hub axle to rotate about the rotational axis, the sprocket support body including a first helical spline;
a first ratchet member comprising:
at least one first ratchet tooth; and
a second helical spline engaged with the first helical spline;
a second ratchet member comprising:
at least one second ratchet tooth engageable with the at least one first ratchet tooth; and
at least one second tooth engaged with the at least one first tooth; and
a sliding member provided between the sprocket support body and the second ratchet member in an axial direction parallel to the rotational axis, the sliding member including a non-metallic material.

2. The bicycle hub assembly according to claim 1, wherein
the sprocket support body includes a first axial surface facing in the axial direction,
the second ratchet member includes a second axial surface facing in the axial direction, and
the sliding member is provided between the first axial surface and the second axial surface in the axial direction.

3. The bicycle hub assembly according to claim 1, wherein
the sliding member has an annular shape.

4. The bicycle hub assembly according to claim 1, wherein
the second ratchet member is provided between the first ratchet member and the sliding member in the axial direction.

5. The bicycle hub assembly according to claim 1, wherein
the non-metallic material includes a resin material.

6. A bicycle hub assembly comprising:
a hub axle defining a rotational axis;
a hub shell rotatably mounted on the hub axle to rotate about the rotational axis, the hub shell including at least one first tooth;
a sprocket support body rotatably mounted on the hub axle to rotate about the rotational axis, the sprocket support body including a first helical spline;
a first ratchet member comprising:
at least one first ratchet tooth; and
a second helical spline engaged with the first helical spline;
a second ratchet member comprising:
at least one second ratchet tooth engageable with the at least one first ratchet tooth; and
at least one second tooth engaged with the at least one first tooth;
a biasing member provided between the hub shell and the first ratchet member in an axial direction parallel to the rotational axis to bias the first ratchet member toward the second ratchet member; and
an additional biasing member provided between the hub shell and the second ratchet member in the axial direction to bias the second ratchet member toward the sprocket support body.

7. The bicycle hub assembly according to claim 6, wherein
the additional biasing member is provided radially outwardly of the biasing member.

8. The bicycle hub assembly according to claim 6, wherein
the additional biasing member is provided radially outwardly of the at least one second ratchet tooth.

9. The bicycle hub assembly according to claim 6, wherein
the second ratchet member includes a cylindrical element extending in the axial direction,
the at least one second tooth extends radially outwardly from the cylindrical element, and
the additional biasing member is provided between the hub shell and the cylindrical element in the axial direction.

10. The bicycle hub assembly according to claim 6, further comprising:
a supporting member provided between the second ratchet member and the additional biasing member in the axial direction.

11. The bicycle hub assembly according to claim 10, wherein
the supporting member includes
an annular base provided between the second ratchet member and the additional biasing member in the axial direction, and
a radially supporting portion extending from the annular base in the axial direction, and
the additional biasing member is provided radially outwardly of the radially supporting portion.

12. The bicycle hub assembly according to claim 10, wherein
the supporting member includes a non-metallic material.

13. A bicycle hub assembly comprising:
a hub axle defining a rotational axis;
a hub shell rotatably mounted on the hub axle to rotate about the rotational axis, the hub shell including at least one first tooth;
a sprocket support body rotatably mounted on the hub axle to rotate about the rotational axis, the sprocket support body including a first helical spline;
a first ratchet member comprising:
  at least one first ratchet tooth; and
  a second helical spline engaged with the first helical spline;
a second ratchet member comprising:
  at least one second ratchet tooth engageable with the at least one first ratchet tooth; and
  at least one second tooth engaged with the at least one first tooth;
a biasing member provided between the hub shell and the first ratchet member in an axial direction parallel to the rotational axis to bias the first ratchet member toward the second ratchet member; and
a receiving member provided between the first ratchet member and the biasing member in the axial direction.

14. The bicycle hub assembly according to claim 13, wherein
the first ratchet member includes a first receiving surface facing in the axial direction, and
the receiving member is provided between the first receiving surface and the biasing member in the axial direction.

15. The bicycle hub assembly according to claim 13, wherein
the first ratchet member includes a cylindrical part extending from the first receiving surface in the axial direction, and
the receiving member is provided radially outwardly of the cylindrical part.

16. The bicycle hub assembly according to claim 15, wherein
the receiving member includes
  an axially receiving part provided between the first receiving surface and the biasing member in the axial direction, and
  a radially receiving part extending from the axially receiving part in the axial direction, the radially receiving part being provided between the cylindrical part and the biasing member in a radial direction perpendicular to the rotational axis.

17. The bicycle hub assembly according to claim 13, wherein
the receiving member includes a non-metallic material.

* * * * *